(12) United States Patent
Schneider et al.

(10) Patent No.: US 9,810,249 B2
(45) Date of Patent: Nov. 7, 2017

(54) ATTACHMENT STRUCTURE OF AN AIRCRAFT

(71) Applicant: Airbus Operations GmbH, Hamburg (DE)

(72) Inventors: Uwe Schneider, Hamburg (DE); Peter Bielik, Hamburg (DE); Hristo Margov, Velingrad (BG); Raj Kotian, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/613,463

(22) Filed: Feb. 4, 2015

(65) Prior Publication Data

US 2015/0226243 A1    Aug. 13, 2015

(30) Foreign Application Priority Data

Feb. 7, 2014    (EP) .................................. 14154358

(51) Int. Cl.

| | |
|---|---|
| *B64C 1/06* | (2006.01) |
| *F16B 1/02* | (2006.01) |
| *B64D 11/00* | (2006.01) |
| *B64C 1/00* | (2006.01) |

(52) U.S. Cl.
CPC ................. *F16B 1/02* (2013.01); *B64C 1/00* (2013.01); *B64D 11/003* (2013.01); *Y02T 50/46* (2013.01); *Y10T 29/49826* (2015.01)

(58) Field of Classification Search
CPC ..... Y10T 29/49826; Y10T 50/46; B64C 1/00; B64D 11/003; F16B 1/02

USPC ........... 244/118.2, 119, 131, 428; 24/573.09, 24/573.11
See application file for complete search history.

(56) References Cited

U.S. PATENT DOCUMENTS

| | | | | |
|---|---|---|---|---|
| 4,621,780 A | * | 11/1986 | Doyhamboure | .......... B64C 1/22 105/396 |
| 4,648,570 A | * | 3/1987 | Abdelmaseh | ............. B64C 1/22 244/117 R |

(Continued)

FOREIGN PATENT DOCUMENTS

| | | |
|---|---|---|
| DE | 10 2006 016509 A1 | 10/2007 |
| EP | 861781 A2 | 9/1998 |

(Continued)

OTHER PUBLICATIONS

European Search Report dated Jun. 20, 2014 (EP 14154358.7).

*Primary Examiner* — Assres H Woldemaryam
(74) *Attorney, Agent, or Firm* — Lerner, David, Littenberg, Krumholz & Mentlik, LLP

(57) ABSTRACT

An attachment structure for an equipment unit of an aircraft includes a first attachment device extending in a longitudinal direction of the aircraft, wherein the first attachment device is attached to a stringer and to a frame and wherein the first attachment device has a first engagement element and a second attachment device attachable to the equipment unit, wherein the second attachment device has a second engagement element adapted for engaging into the first engagement element, such that a force from the equipment unit in the longitudinal direction on the second attachment device is transferred via the second engagement element to the first engagement element and via the first attachment device to the stringer and the frame.

18 Claims, 5 Drawing Sheets

(56) References Cited

U.S. PATENT DOCUMENTS

| | | | | |
|---|---|---|---|---|
| 5,217,184 A * | 6/1993 | Hararat-Tehrani | B64D 9/00 244/118.1 |
| 5,785,303 A * | 7/1998 | Kutschi | A47C 23/00 267/103 |
| 6,173,550 B1 * | 1/2001 | Tingley | B29C 70/025 52/837 |
| 8,074,928 B2 * | 12/2011 | Haack | B64C 1/18 244/118.5 |
| 8,317,132 B2 | 11/2012 | Pein et al. | |
| 8,632,035 B2 * | 1/2014 | Lozano Garcia | B64C 7/00 244/131 |
| 2002/0150747 A1* | 10/2002 | Wellman | B29C 70/081 428/293.7 |
| 2008/0083129 A1* | 4/2008 | Allert | B64C 1/20 33/533 |
| 2010/0127123 A1* | 5/2010 | Hoffjann | B64D 11/02 244/118.1 |
| 2010/0133381 A1* | 6/2010 | Klaukien | B64C 1/064 244/119 |
| 2010/0200696 A1* | 8/2010 | Pein | B64D 11/003 244/118.2 |
| 2010/0230537 A1* | 9/2010 | Huber | B64C 1/20 244/118.2 |
| 2010/0230544 A1* | 9/2010 | Huber | B64D 9/00 244/131 |
| 2010/0314495 A1* | 12/2010 | Dazet | B60P 7/0807 244/131 |
| 2011/0001010 A1* | 1/2011 | Tacke | B64C 1/061 244/131 |
| 2012/0006942 A1* | 1/2012 | Coulter | B64C 3/28 244/131 |
| 2012/0025024 A1* | 2/2012 | Robrecht | H02G 3/0456 244/131 |
| 2012/0037756 A1* | 2/2012 | Guthke | B64C 1/406 244/131 |
| 2012/0132756 A1* | 5/2012 | Roming | B64C 1/061 244/131 |
| 2012/0211604 A1* | 8/2012 | Schlipf | B64C 9/22 244/131 |
| 2012/0228431 A1* | 9/2012 | Umlauft | B64C 1/406 244/131 |
| 2012/0234976 A1* | 9/2012 | Neumann | B61D 17/048 244/131 |
| 2012/0234977 A1* | 9/2012 | Kawahara | B64C 3/34 244/131 |
| 2012/0241560 A1* | 9/2012 | Erickson | B64C 1/26 244/131 |
| 2012/0248248 A1* | 10/2012 | Thompson | B64D 1/18 244/130 |
| 2013/0062470 A1* | 3/2013 | Loupias | B64C 1/061 244/131 |
| 2013/0092793 A1* | 4/2013 | Braeutigam | B64C 1/068 244/131 |
| 2013/0181092 A1* | 7/2013 | Cacciaguerra | B64C 1/068 244/131 |

FOREIGN PATENT DOCUMENTS

| | | |
|---|---|---|
| WO | 2008/129038 A1 | 10/2008 |
| WO | 2013/017506 A1 | 2/2013 |

* cited by examiner

ATTACHMENT STRUCTURE OF AN AIRCRAFT

FIELD OF THE INVENTION

The invention relates to an attachment structure of an aircraft and a method for attaching an equipment unit to a primary structure of an aircraft.

BACKGROUND OF THE INVENTION

In an aircraft, equipment units like monuments, galleys, cupboards, toilets, hat racks, etc. are usually connected to the primary structure of the aircraft to prevent moving of the equipment unit during phases of acceleration and deceleration. An important situation relates to very strong phases in the x-direction (longitudinal direction) of the aircraft, which, for example, may develop in a crash situation. According to current standards, the attachment of an equipment unit to the aircraft has to withstand an acceleration of up to 9 g (1 g=standard gravitational acceleration on earth).

Furthermore, considering a movable bin, loads on the movable bin and on the baggage inside and a possible crash load factor of 9 g forward usually cannot directly transfer into the primary structure, but have to be transferred via bearings used for moving the bin during opening and closing. Usually, a separate unmovable housing is surrounding the movable bin for attaching a tie rod and for transferring loads to the primary structure. For the supply of x-forces (longitudinal forces), usually a tie rod in longitudinal direction is linked to the intersection between a frame and a stringer of the primary structure of the aircraft. However, such a tie rod may need additional space and may add to the weight of the aircraft.

In WO 2013/017506 A1, a movable bin is described that is movable via rails at the side of the bin. Load paths from the bin to the rail and then into the structure are provided. With the solution, the rails have to be stiff enough to be able to transfer the load of the crash load case 9 g forward.

BRIEF SUMMARY OF THE INVENTION

An aspect of the invention relates to an attachment structure for a equipment unit of an aircraft. An equipment unit may be any interior component of the aircraft that may be directly used by persons inside the aircraft. The equipment unit may be one of a monument, galley, a toilet monument, a cupboard, a hat rack, a movable bin, etc. For example, the aircraft may be a passenger plane.

According to an embodiment of the invention, the attachment structure comprises a first attachment device (or first attachment bracket) attached to the primary structure of the aircraft and a second attachment device (or second attachment bracket) attached to the equipment unit. The first attachment device extends in a longitudinal direction of the aircraft, wherein the first attachment device is attached to a stringer (extending in the longitudinal direction) and to a frame (extending around the aircraft). The first attachment device has a first engagement element. The second attachment device is attachable to the equipment unit, wherein the second attachment device has a second engagement element adapted for engaging into the first engagement element, such that a force from the equipment unit in the longitudinal direction on the second attachment device is transferred via the second engagement element to the first engagement element and via the first attachment device to the stringer and the frame.

With the attachment structure, the load from the equipment unit is directly distributed to the primary structure, comprising the frame and the stringer. No tie rods are necessary. The space between the frames also may be used for accommodating parts of the equipment unit.

The attachment structure may be used for saving weight, saving space and/or to have a better integration of moving or fast removable equipment units, cabin elements and equipment (such as trolleys) directly to the primary structure.

The first attachment device may be attached to the stringer that one side of the first attachment device is attached via a number of attachment points in the longitudinal direction to the stringer. Furthermore, the first attachment device may be attached to the frame such that it is supported on a further side by the frame in the case of a strong force in forward direction.

According to an embodiment of the invention, the first attachment device comprises a plate extending in the longitudinal direction. Such a plate may be fixed to the stringer and the frame, for example with rivets or screws.

According to an embodiment of the invention, the plate is attached with a first edge to the stringer and is attached with a second edge to the frame and provides the first engagement element at a third edge opposite to the first edge. The second edge may be supported by a side of the frame facing in a direction away from the cockpit of the aircraft. The plate may have a trapezoid form with the first and second edge substantially orthogonal. The third edge may be shorter than the first edge. The plate may transfer crash loads in the longitudinal direction by its profile form. For example, a forth edge opposite to the second edge may be concavely bent.

According to an embodiment of the invention, the equipment unit is attached to a (further) frame and/or a (further) stringer of the aircraft via at least one further attachment device. For example, the equipment unit may be a bin or hat rack with an outer housing that is attached to two frames near corners of the housing. The second attachment device may be attached to a frame between the two frames.

According to an embodiment of the invention, the further attachment device comprises a resilient member for damping movement in a direction orthogonal to the longitudinal direction. Due to an attachment of the equipment unit via the attachment structure away from a balance point of the equipment units, loads may generate a torque that may be damped by the resilient member. Furthermore, vibrations caused by the operation of the aircraft may be damped by the resilient member and not transferred to the equipment unit.

According to an embodiment of the invention, the first engagement element has a tooth profile and the second engagement element has a profile adapted for engaging into the tooth profile. The two engagement elements may engage with form closure. As an example, the first engagement element may have an indentation substantially orthogonal to the longitudinal direction and the second engagement element may have a pin engaging into the indentation.

In general, the tooth profile may have protrusions or indentations in a direction orthogonal to the longitudinal direction. For example, the tooth profile may be a saw tooth profile. Also the second engagement element may have a saw tooth profile, which also may provide adjustability of the attachment structure in the longitudinal direction.

According to an embodiment of the invention, the first engagement element and the second engagement element form a lock mechanism adapted for unlocking, when moving the second attachment device away from the first attachment device. The two profiles of the first and second engagement element may provide a contact in closed position (for example by direct securing by form closure). The two engagement elements may provide a quick attach/release mechanism for an easy tailoring and/or reconstruction of the interior of the aircraft.

For example, the second engagement element may comprise a pin or bar that is adapted to be engaged into a spring biased hook of the first engagement element.

According to an embodiment of the invention, the first engagement element and the second engagement element are adapted for engage in a number of positions along the longitudinal direction. For example, both engagement elements may comprise a saw tooth profile (comparable to a gear rod). In such a way, the equipment unit may be attached to the primary structures at different positions, without the necessity to dismount the second attachment device from the equipment unit.

According to an embodiment of the invention, the second attachment device is movable between an opened and a closed position, such that the second engagement element engages the first engagement in the closed position. For example, the second attachment device may be moved together with a component of the equipment unit, such as a drawer or movable bin. However, it also may be possible that the second attachment device is movable along one or more rods to engage into the first attachment element.

According to an embodiment of the invention, the equipment unit comprises a movable bin that is movable with respect to an outer structure which is attached to the aircraft, wherein the movable bin is movable between a closed position and an opened position. The equipment unit may be a trolley container and the movable bin may be a trolley. The equipment unit may be a cupboard and the movable bin may be a drawer. The equipment unit may be an overhead bin with an outer housing.

According to an embodiment of the invention, the second attachment device is attached to the movable bin, such that the second engagement element engages the first engagement (in particular only) in the closed position. The crash loads may only have to be ensured by a closed bin. To certify a bin, it may be only necessary to calculate the crash load in standard (closed) position. In turbulences during flight or starting/landing operations, the movable bin has to be closed. With the second attachment device directly fixed to the movable bin and the first attachment device directly fixed on the primary structure, the robustness against high loads may be ensured in the closed position.

In general, the attachment structure may be provided for movable bins with (partial) housings, without housing, with tracks and/or rails for moving the bin and/or for pivoted bins.

According to an embodiment of the invention, the outer structure is an outer housing partially surrounding the movable bin and having an opening in a back wall, such that the second attachment device at a back wall of the movable bin is engageable into the first attachment device. However, it is also possible that the outer structure comprises small beams or rods, which support the bearings of the movable bin.

According to an embodiment of the invention, the movable bin is rotatable around the longitudinal direction with respect to the outer structure via bearings. For example, the movable bin may comprise bearings at two opposite sides that face in the longitudinal direction of the aircraft.

According to an embodiment of the invention, the movable bin is movable with respect to the outer structure via a rail mechanism. For example, the movable bin may comprise rods at two opposite sides that face in the longitudinal direction of the aircraft. These rods may roll or slide in rails facing the two opposite sides and that are supported by the outer structure.

According to an embodiment of the invention, the movable bin is mounted to the outer structure with bearings adapted for floating in the longitudinal direction. Since nearly most of a load in longitudinal direction is transferred via the attachment structure. The bearings (such as pivotal bearings, rails, tracks) do not have to transfer high loads in longitudinal direction and may be more lightweight and/or smaller. In particular, it is not necessary that the bearings are supported in longitudinal direction.

A further aspect of the invention relates to a method for attaching a equipment unit to a primary structure of an aircraft. The method may be performed with the attachment structure as described in the above and in the following. It has to be understood that features of the method as described in the above and in the following may be features of the attachment structure as described in the above and in the following and vice versa.

According to an embodiment of the invention, the method comprises attaching a first attachment device extending in a longitudinal direction of the aircraft to a stringer and to a frame, attaching a second attachment device to the equipment unit, engaging a first engagement element of the first attachment device into a second engagement element of the second attachment device, such that a force from the equipment unit in the longitudinal direction on the second attachment device is transferred via the second engagement element to the first engagement element and via the first attachment device to the stringer and the frame.

According to an embodiment of the invention, the method comprises engaging the first engagement element into the second engagement element, when moving the movable bin and/or the second attachment device from the opened position into the closed position, disengaging the first engagement element from the second engagement element, when moving the movable bin and/or the second attachment device from the closed position to the opened position. The engaging may be performed by moving a movable bin with the second attachment device attached to a back side or by an attachment device that is designed for being moved between two positions (while the equipment unit is not moving).

With such a movable bin, a crash load may be directly transferred from the movable bin to the primary structure of the aircraft, when the movable bin is closed.

According to an embodiment of the invention, the method further comprises locking the movable bin in the closed position with the first and second engagement elements. The lock mechanism may be used for locking the bin. However, it also may be possible that the movable bin comprises a further locking mechanism for locking the bin in the closed position.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
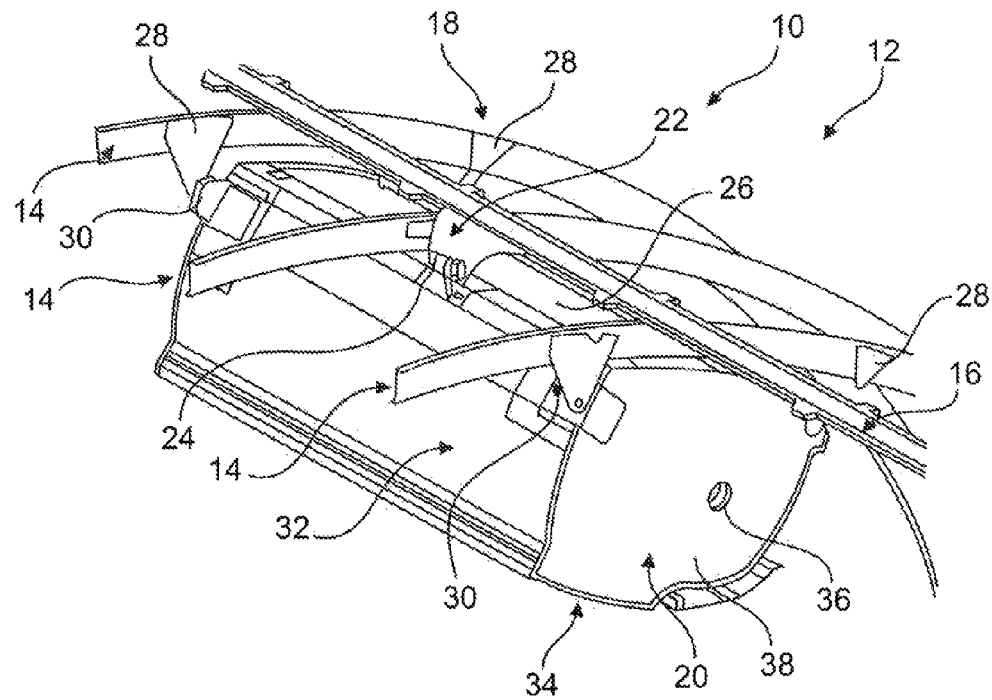
FIG. 1 shows a perspective view of an attachment structure according to an embodiment of the invention.

FIG. 1 shows the primary structure 10 of an aircraft 12 comprising frames 14 surrounding the fuselage of the aircraft 12 and comprising stringers 16 that extend in a longitudinal direction over the frames 14. The frames 14 are usually rings surrounding the fuselage of the aircraft 12.

Furthermore, FIG. 1 shows an attachment structure 18 that directly connects an equipment unit 20 to the primary structure 10. The attachment structure 18 comprises a first attachment device 22 that is attached to a frame 14 and a stringer 16 at a crossing point of the frame 14 and the stringer 16, and a second attachment device 24 that is attached to a back or rear wall 26 of the equipment unit 20. Most of the force acting on the equipment unit in longitudinal direction is directly transferred by the second attachment device 24 to the first attachment device 22 engaged in the second attachment device 24 and then directly transferred into the primary structure 10.

The equipment unit 20 is attached via further attachment devices 28 to two further frames 14 of the aircraft. While the second attachment device 24 is attached substantially to the middle of the back wall with respect to the longitudinal direction, the further attachment devices 28 are attached to corners of the equipment unit 20. Each further attachment device 28 comprises a plate extending substantially orthogonal to the longitudinal direction. The plate has a triangular form with one side attached to the frame 14 and the opposite corner attached to the equipment unit 20.

The further attachment device 28 may eliminate a torque created by a tilting equipment unit 20 that may be generated by forces acting on the equipment unit. The further attachment device 28 may comprise a resilient member 30, such as resilient hard rubber, to eliminate/reduce vibrations.

The equipment unit 20 of FIG. 1 is an overhead storage bin comprising a fixed outer housing 32 surrounding a movable bin 34. The movable bin 34 is attached to the housing 32 via rotatable bearings 36, which are coupling sidewalls 38 of the outer housing 32 and the movable bin 34. The attachment structure 18 as well as the further attachment devices 28 are attached to the outer housing 32.

Figure 2:
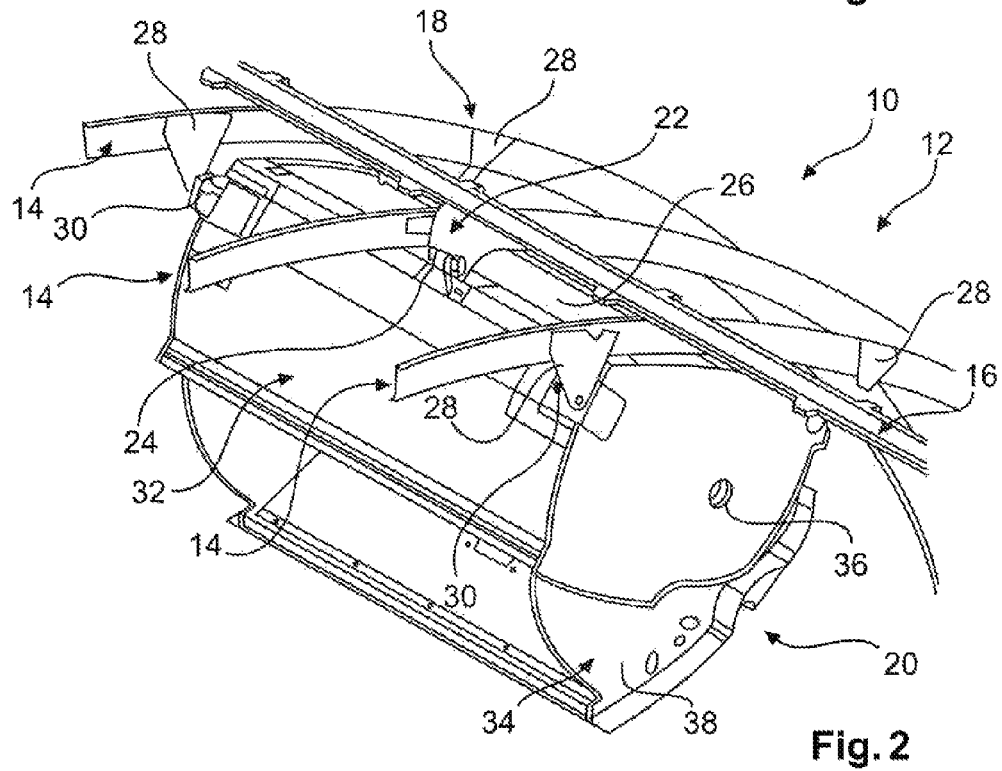
FIG. 2 shows the attachment structure of FIG. 1 with a movable bin in opened position.

FIG. 1 shows the movable bin 34 in closed position and FIG. 2 shows the movable bin 34 in opened position. As shown in FIG. 2, when the movable bin 34 is opened, the attachment structure 18 stays engaged, i.e. the outer housing 32 is attached to the primary structure 10 in the closed and in the opened position.

Figure 3:
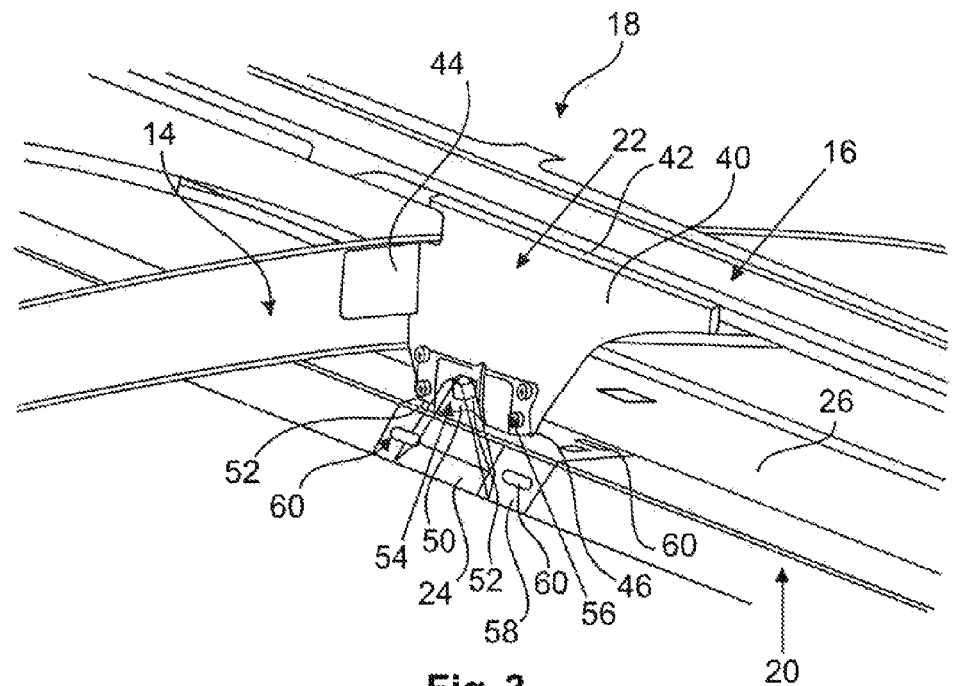
FIG. 3 shows a detail of FIG. 1

FIG. 3 shows more details of the attachment structure 18 of FIGS. 1 and 2. The first attachment device 22 comprises a plate 40 that with a first edge 42 is attached to the stringer 16. The first edge 42 is attached via its length, for example, via a number of rivets at different longitudinal positions. A second edge 44 of the plate 40 is attached to the frame 14. Again, the second edge 44 may be attached to the frame 14 via its length. The attachment structure 18 may have an L-shaped or T-shaped form, whereas the base of the L or the top of the T is attached to the frame 14.

At a third side 46 opposite to the first edge 42, a first engagement element 48 is attached to the plate 40. The first engagement element 48 may be a separate element fixed to the plate 40 or may be one-piece with the plate 40.

The first engagement element 48 comprises an opening 50 neighboured by two tooth-like elements 52 or protrusions 52 that extend like the opening 50 in a direction orthogonal to the longitudinal direction of the aircraft 12. The opening 50 is adapted for receiving a pin 54 or bar 54 of the second attachment device 24.

Furthermore, the first engagement element 48 may comprise a lock mechanism 56 that keeps the bar 54 in the opening 50. Alternatively, the lock mechanism 56 may be part of the second attachment device 24.

The second attachment device 24 comprises a base plate 58 which has a number of elongated openings 60 which may be used for attaching the second attachment device 24 to the equipment unit 20. Due to the elongated openings 60, the longitudinal position of the second attachment device 24 with respect to the equipment unit 20 is adjustable.

The base plate 58 carries a second engagement element 62 comprising two triangle shaped members carrying the bar 54 between them. In general, the first engagement element and/or the second engagement element may be adjustable to compensate tolerances between neighbouring equipment units.

Figure 4:
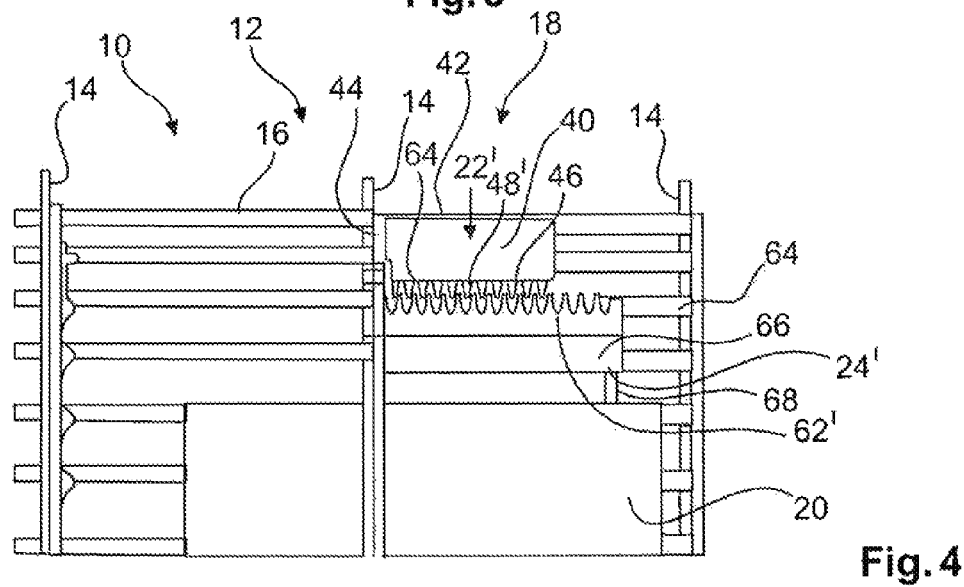
FIG. 4 shows a view from the side on an attachment structure according to a further embodiment of the invention.
Figure 5:
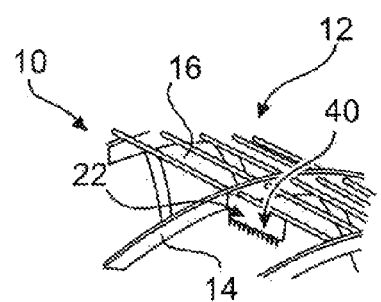
FIG. 5 shows a perspective view of an attachment device of FIG. 4 attached to a primary structure of an aircraft.
Figure 6:
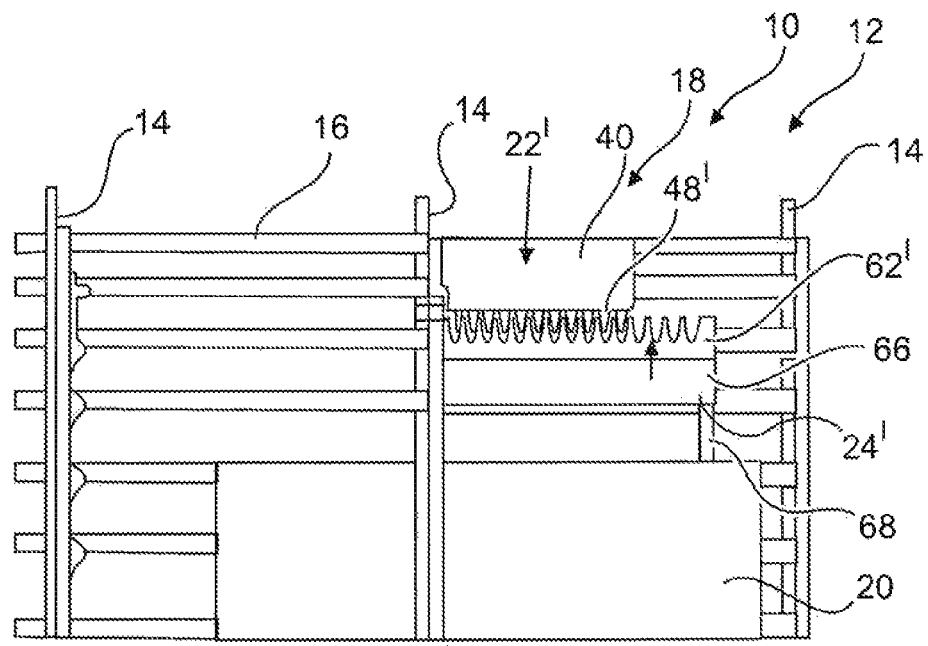
FIG. 6 shows the attachment structure of FIG. 4 in a closed position.

FIG. 4 shows a further attachment structure 18 with alternative embodiments of a first attachment device 22' and a second attachment device 24'. As shown in FIG. 5, the attachment device 22 may have a plate 40 and may be attached to the stringer 16 and the frame 14 like the attachment device 22 of FIG. 3.

The engagement elements 48', 62' may have saw tooth profiles 64 with openings neighboured by tooth-like elements or protrusions that extend like the openings in a direction orthogonal to the longitudinal direction of the aircraft 12.

The attachment device 24' is movable in a direction orthogonal to the longitudinal direction between an opened position (shown in FIG. 4) and a closed position (shown in FIG. 5). For example, the attachment device 24' may have a base 66 that is movable on bars 68 attached to the top side or back side of the equipment unit 20. For example, the movement may be affected by a lever. Also the attachment device 22 and/or the attachment device 24 may comprise a lock mechanism for keeping the attachment structure 18 in closed position.

Figure 7:
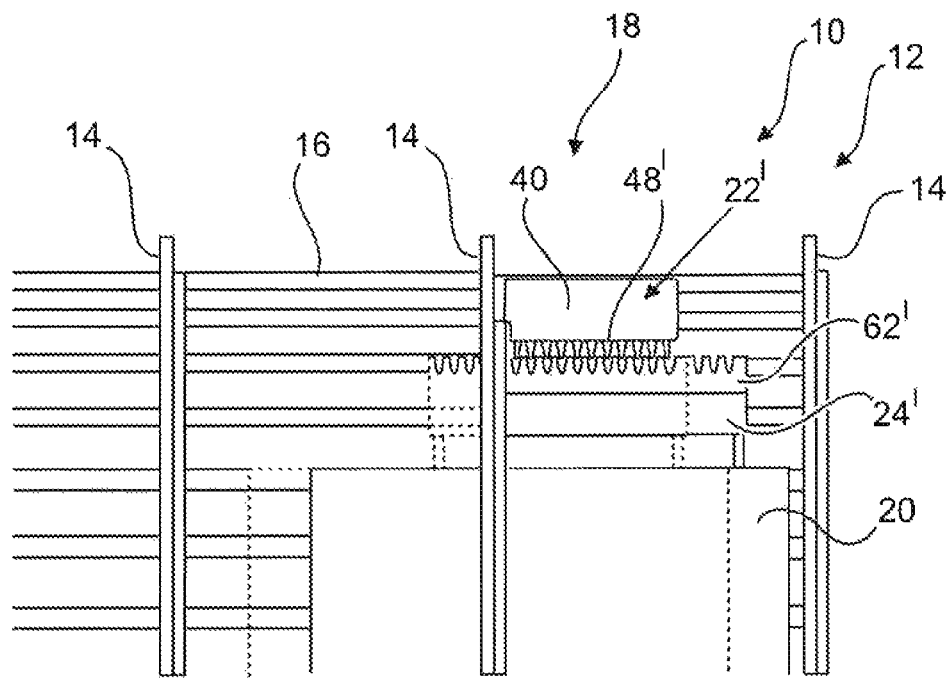
FIG. 7 shows the attachment structure of FIG. 4 in different engagement positions.

As shown in FIG. 7, the saw tooth profile 64 may have teeth or protrusions of equal length and therefore, the engagement elements 48', 62' may be adapted for engaging in a number of different longitudinal spaced positions. This may help to attach the equipment unit 20 at different longitudinal positions with the primary structure 10 without modifying the attachment devices 22, 24'.

Figure 8:
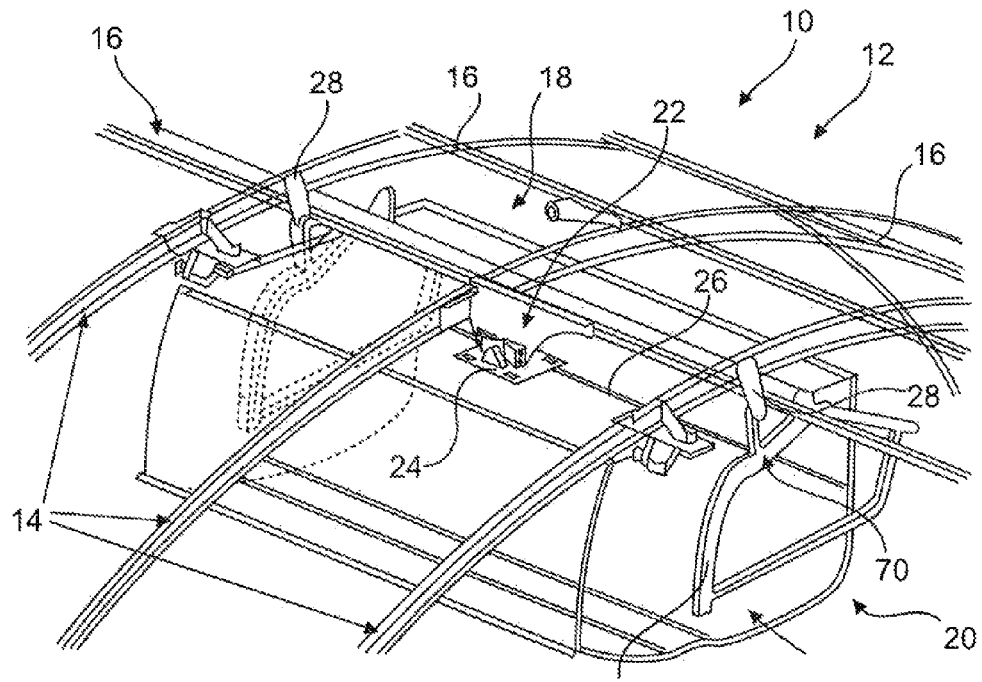
FIG. 8 shows a perspective view of an attachment structure according to a further embodiment of the invention.
Figure 9:
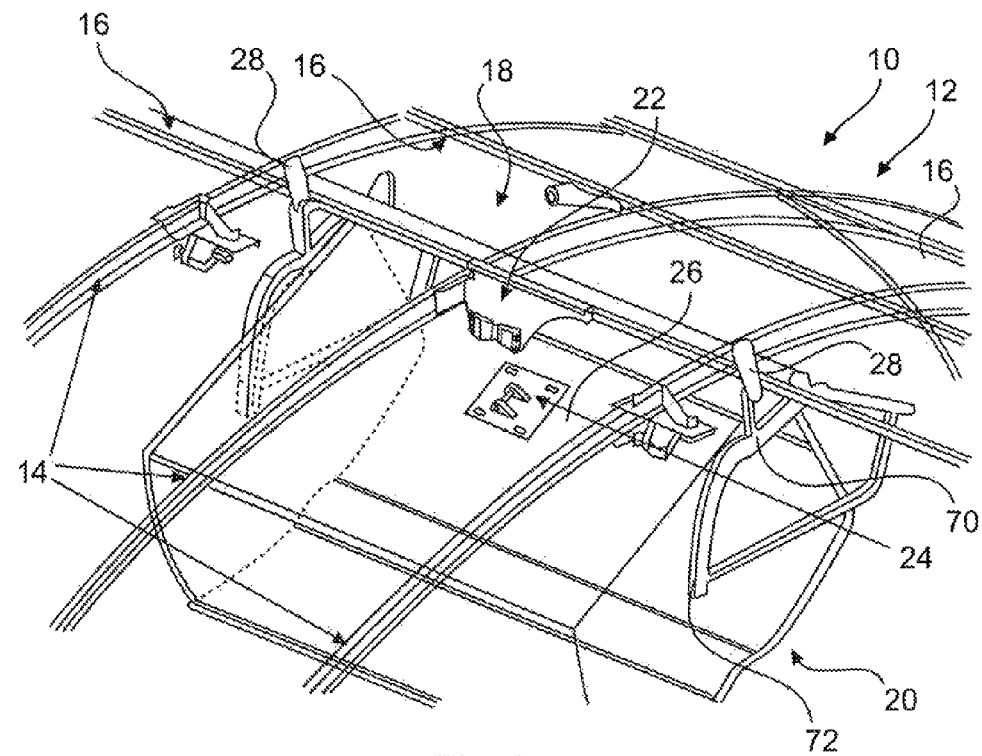
FIG. 9 shows the attachment structure of FIG. 9 with a movable bin in opened position.

FIGS. 8 and 9 show a movable bin 34 that is movable in a rail mechanism 70, which is attached via further attachment devices 28 to the primary structure 10. The rail mechanism 70 has a track 72 or rail 72, in which a pin attached to a side wall 38 of the movable bin 34 is guided. FIG. 8 shows the movable bin 34 in closed position and FIG. 9 shows the movable bin in opened position.

The attachment structure 18 has the same elements as the attachment structure shown in FIG. 1 to 3. However, the second attachment device 24 is attached to a back wall of the movable bin 34. In closed position, the attachment device 24 engages the attachment device 22 and the movable bin 34 is secured with respect to forces in the longitudinal direction. When the movable bin 34 is opened, the attachment devices 22 and 24 disengage and the lock mechanism 56 is released. The lock mechanism 56 may be used for keeping the movable bin 34 in closed position.

Figure 10:
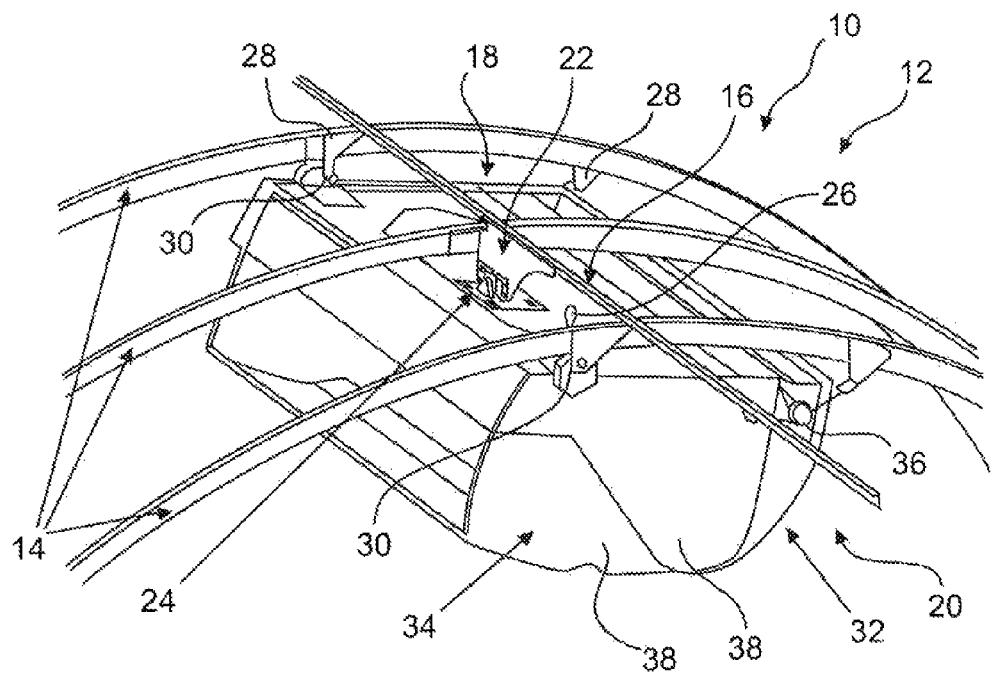
FIG. 10 shows a perspective view of an attachment structure according to a further embodiment of the invention.
Figure 11:
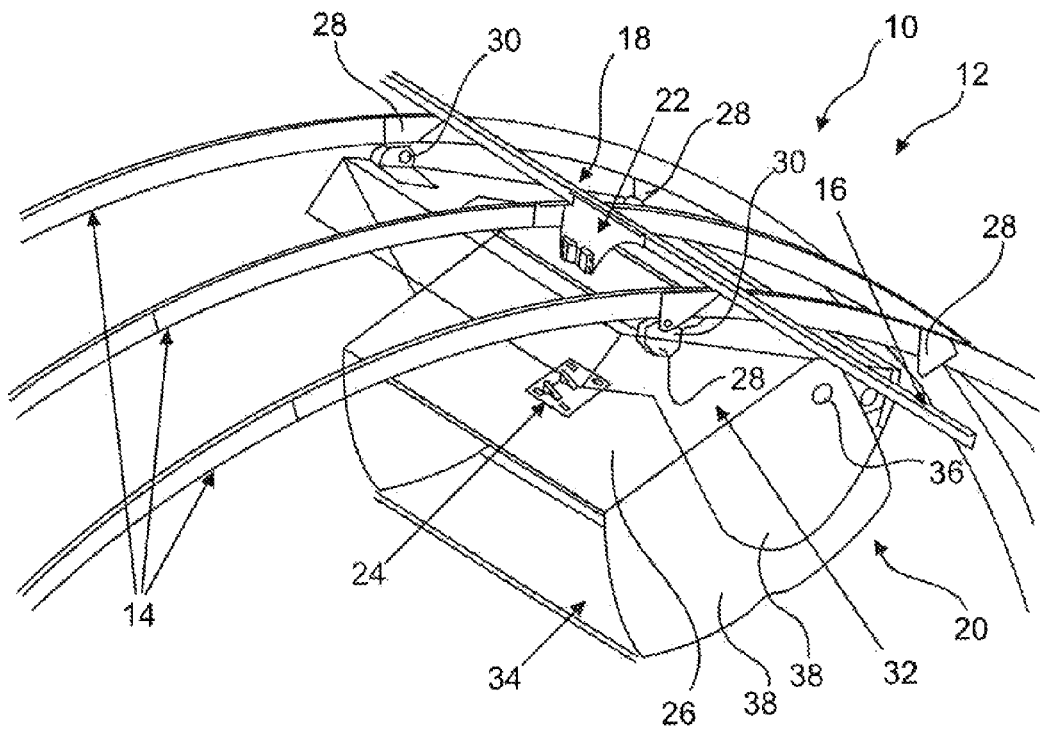
FIG. 11 shows the attachment structure of FIG. 10 with a movable bin in opened position.

FIGS. 10 and 11 show a movable bin 34 surrounded by a partial outer housing 32. Similarly to FIGS. 8 and 9, the attachment structure 18 has the same elements as the attachment structure shown in FIG. 1 to 3 and the second attachment device 24 is attached to a back wall of the movable bin 34. The partial outer housing 32 has an opening through which the second attachment device 24 may reach to engage the first attachment device 22.

Since the movable bin 34 of FIGS. 8 and 9 and also the movable bin 34 of FIGS. 10 and 11 is directly attached to the primary structure 10 via the attachment structure 18, loads on the movable bin are transferred directly via the attachment structure 18. The rail mechanism 70 or the bearings 36 do not need to be designed to transfer high longitudinal forces. Therefore, the rail mechanism 70 and/or the bearings 36 may be floating bearings.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SYMBOLS

10 primary structure
12 aircraft
14 frame
16 stringer
18 attachment structure
20 equipment unit
22, 22' first attachment device
24, 24' second attachment device
26 back wall
28 further attachment device
30 resilient member
32 outer housing
34 movable bin
36 bearing
38 sidewall
40 plate
42 first edge
44 second edge
46 third edge
48, 48' first engagement element
50 opening
52 protrusion
54 bar
56 locking mechanism
58 base plate
60 elongated opening
62, 62' second engagement element
64 saw tooth profile
66 base
68 bar
70 rail mechanism
72 track

The invention claimed is:

1. An aircraft comprising:
an attachment structure; and
an equipment unit,
wherein the attachment structure comprises:
a first attachment device extending in a longitudinal direction of the aircraft, wherein the first attachment device is attached to a stringer and to a first frame and wherein the first attachment device has a first engagement element;
a second attachment device attached to the equipment unit, wherein the second attachment device has a second engagement element adapted for engaging into the first engagement element, such that a force from the equipment unit in the longitudinal direction on the second attachment device is transferred via the second engagement element to the first engagement element and via the first attachment device to the stringer and the first frame;
wherein the equipment unit comprises a movable bin movable with respect to an outer structure attached to the aircraft, wherein the movable bin is movable between a closed position and an opened position,
wherein the second attachment device is attached to the movable bin, such that the second engagement element engages the first engagement element in the closed position of the movable bin,
wherein the first attachment device comprises a plate extending in the longitudinal direction, and wherein the plate is attached with a first edge to the stringer and is attached with a second edge to the first frame and provides the first engagement element at a third edge opposite to the first edge.

2. The aircraft of claim 1, wherein the equipment unit is attached to a second frame and/or the stringer of the aircraft via at least one further attachment device.

3. The aircraft of claim 2, wherein the further attachment device comprises a resilient member for damping movement in a direction orthogonal to the longitudinal direction.

4. The aircraft of claim 1, wherein the first engagement element has a tooth profile and the second engagement element has a profile adapted for engaging into the tooth profile.

5. The aircraft of claim 1, wherein the first engagement element and the second engagement element form a lock mechanism adapted for unlocking, when moving the second attachment device away from the first attachment device.

6. The aircraft of claim 1, wherein the first engagement element and the second engagement element are adapted for engaging in a number of positions along the longitudinal direction.

7. The aircraft of claim 1, wherein the second attachment device is movable between an opened and a closed position, such that the second engagement element engages the first engagement element in the closed position of the second attachment device.

8. The aircraft of claim 1,
wherein the movable bin is rotatable around the longitudinal direction with respect to the outer structure via bearings; or
wherein the movable bin is movable with respect to the outer structure via a rail mechanism.

9. The aircraft of claim 1, wherein the movable bin is mounted to the outer structure with bearings adapted for floating in the longitudinal direction.

10. An aircraft comprising:
an attachment structure; and
an equipment unit,
wherein the attachment structure comprises:
a first attachment device extending in a longitudinal direction of the aircraft,
wherein the first attachment device is attached to a stringer and to a first frame and wherein the first attachment device has a first engagement element;
a second attachment device attached to the equipment unit, wherein the second attachment device has a second engagement element adapted for engaging into the first engagement element, such that a force from the equipment unit in the longitudinal direction on the second attachment device is transferred via the second engagement element to the first engagement element and via the first attachment device to the stringer and the first frame;
wherein the equipment unit comprises a movable bin movable with respect to an outer structure attached to the aircraft, wherein the movable bin is movable between a closed position and an opened position,
wherein the second attachment device is attached to the movable bin, such that the second engagement element engages the first engagement element in the closed position of the movable bin, and
wherein the outer structure is an outer housing partially surrounding the movable bin and having an opening in a back wall, such that the second attachment device at a back wall of the movable bin is engageable into the first attachment device.

11. The aircraft of claim 10, wherein the equipment unit is attached to a second frame and/or the stringer of the aircraft via at least one further attachment device.

12. The aircraft of claim 11, wherein the further attachment device comprises a resilient member for damping movement in a direction orthogonal to the longitudinal direction.

13. The aircraft of claim 10, wherein the first engagement element and the second engagement element form a lock mechanism adapted for unlocking, when moving the second attachment device away from the first attachment device.

14. The aircraft of claim 10, wherein the first engagement element and the second engagement element are adapted for engaging in a number of positions along the longitudinal direction.

15. The aircraft of claim 10, wherein the second attachment device is movable between an opened and a closed position, such that the second engagement element engages the first engagement element in the closed position of the second attachment device.

16. A method for attaching an equipment unit to a primary structure of an aircraft, the method comprising:
attaching a first attachment device extending in a longitudinal direction of the aircraft to a stringer and to a first frame;
attaching a second attachment device to the equipment unit; and
engaging a first engagement element of the first attachment device into a second engagement element of the second attachment device, such that a force from the equipment unit in the longitudinal direction on the second attachment device is transferred via the second engagement element to the first engagement element and via the first attachment device to the stringer and the first frame;
providing, as the equipment, a movable bin movable with respect to an outer structure attached to the aircraft, wherein the movable bin is movable between a closed position and an opened position; and
attaching the second attachment device to the movable bin, such that the second engagement element engages the first engagement element in the closed position of the movable bin,
wherein the first attachment device comprises a plate extending in the longitudinal direction, and
wherein the plate is attached with a first edge to the stringer and is attached with a second edge to the first frame and provides the first engagement element at a third edge opposite to the first edge.

17. The method of claim 16, further comprising:
engaging the first engagement element into the second engagement element, when moving the second attachment device from an disengaged position into an engaged position; and
disengaging the first engagement element from the second engagement element, when moving the second attachment device from the engaged position to the disengaged position.

18. The method of claim 17, further comprising:
locking the movable bin in the closed position with the first and second engagement elements.

* * * * *